(12) United States Patent
Kinzie et al.

(10) Patent No.: US 8,317,469 B2
(45) Date of Patent: Nov. 27, 2012

(54) WIND TURBINE SHROUD

(75) Inventors: Kevin Wayne Kinzie, Spartanburg, SC (US); Thomas Joseph Fischetti, Simpsonville, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/251,628

(22) Filed: Oct. 3, 2011

(65) Prior Publication Data
US 2012/0141250 A1    Jun. 7, 2012

(51) Int. Cl.
*F03D 11/00* (2006.01)
(52) U.S. Cl. .................................... 415/211.2
(58) Field of Classification Search ............ 415/2.1, 415/126, 211.2
See application file for complete search history.

(56) References Cited

U.S. PATENT DOCUMENTS

| 4,324,985 | A | * | 4/1982 | Oman | 290/55 |
| 5,447,412 | A | * | 9/1995 | Lamont | 415/4.2 |
| 6,710,468 | B1 | * | 3/2004 | Marrero O'Shanahan | 290/55 |
| 6,951,443 | B1 | * | 10/2005 | Blakemore | 415/4.3 |
| 7,018,166 | B2 | * | 3/2006 | Gaskell | 415/4.3 |
| 7,939,961 | B1 | * | 5/2011 | Bonnet | 290/55 |
| 8,072,089 | B2 | * | 12/2011 | Krouse et al. | 290/54 |
| 8,125,098 | B2 | * | 2/2012 | Kim et al. | 290/55 |
| 2009/0191064 | A1 | | 7/2009 | Herr et al. | |
| 2009/0295164 | A1 | * | 12/2009 | Grabau et al. | 290/55 |
| 2010/0166556 | A1 | | 7/2010 | Kirtley | |
| 2010/0308595 | A1 | * | 12/2010 | Chen | 290/55 |
| 2011/0109092 | A1 | * | 5/2011 | Echemendia | 290/55 |

* cited by examiner

*Primary Examiner* — Ninh H Nguyen
*Assistant Examiner* — Liam McDowell
(74) *Attorney, Agent, or Firm* — Dority & Manning, P.A.

(57) ABSTRACT

A shroud for a wind turbine and a method for modifying performance of a wind turbine are disclosed. The wind turbine includes a rotor mounted to a nacelle, the rotor including a plurality of rotor blades and defining an outer diameter. The shroud is positioned downstream of the rotor in an air flow direction, and has an inner diameter of less than the outer diameter of the rotor.

20 Claims, 5 Drawing Sheets

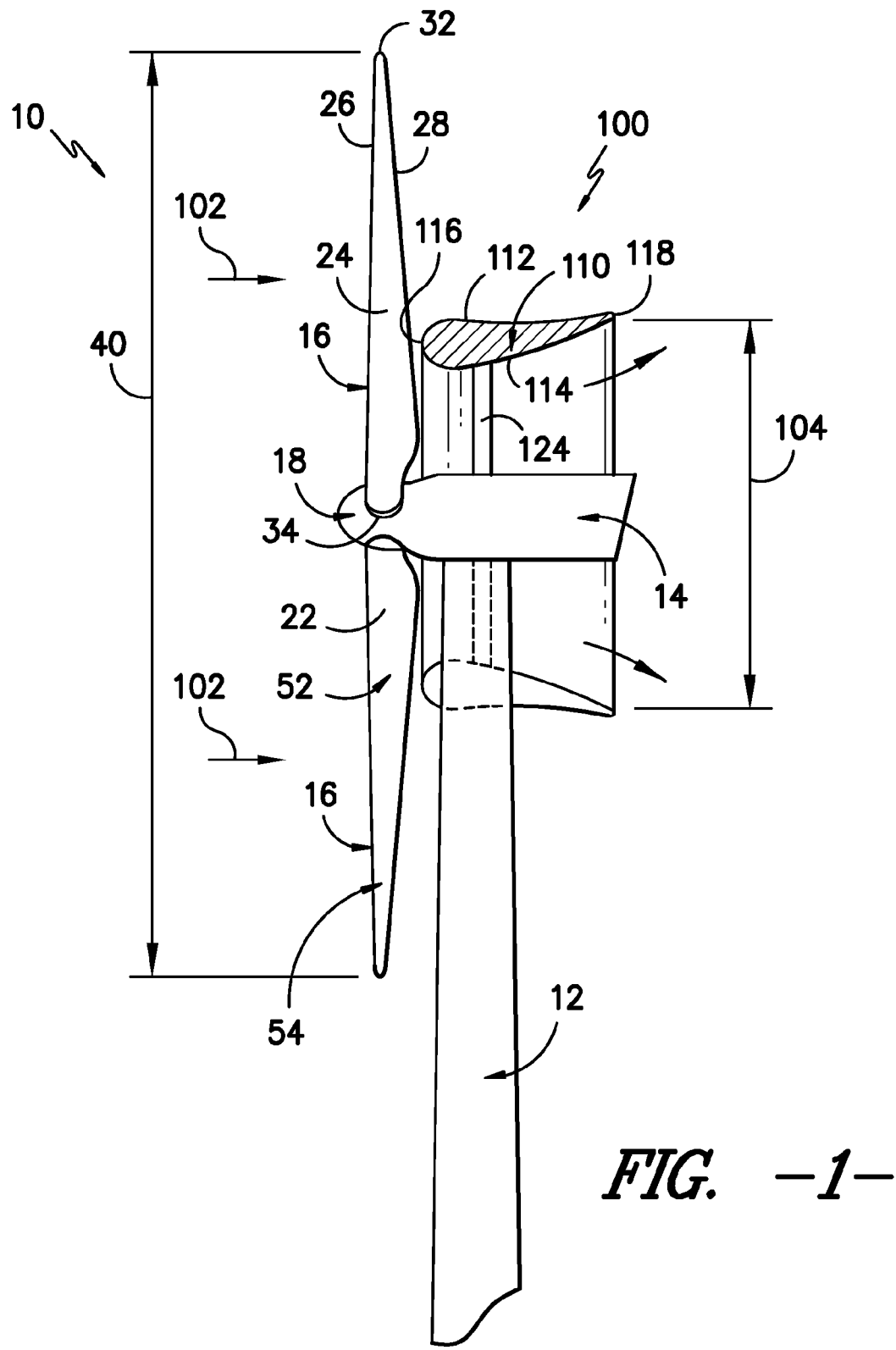
FIG. −1−

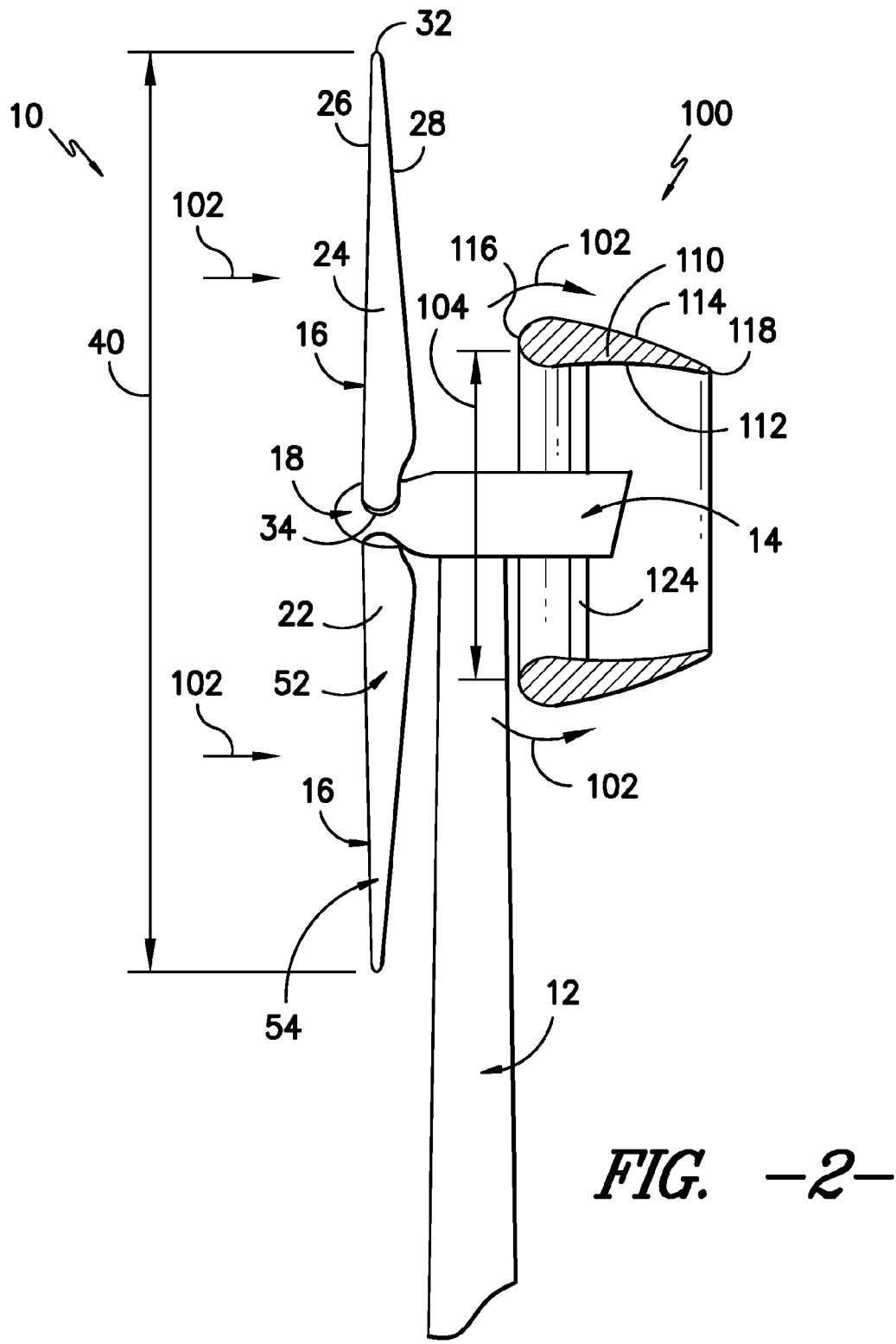
FIG. -2-

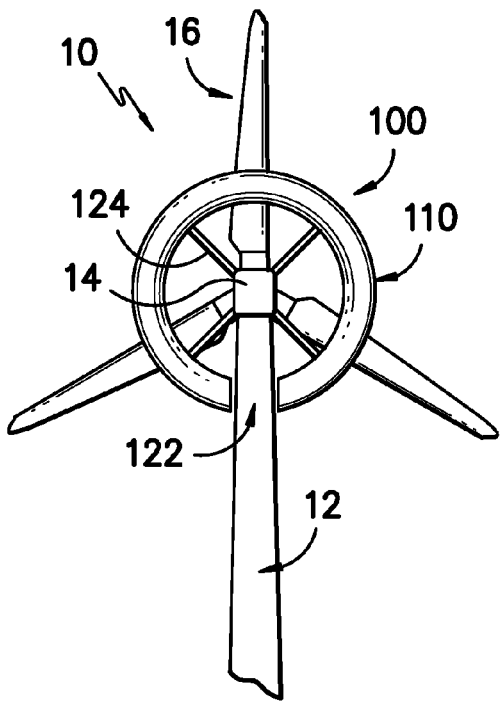
FIG. -3-
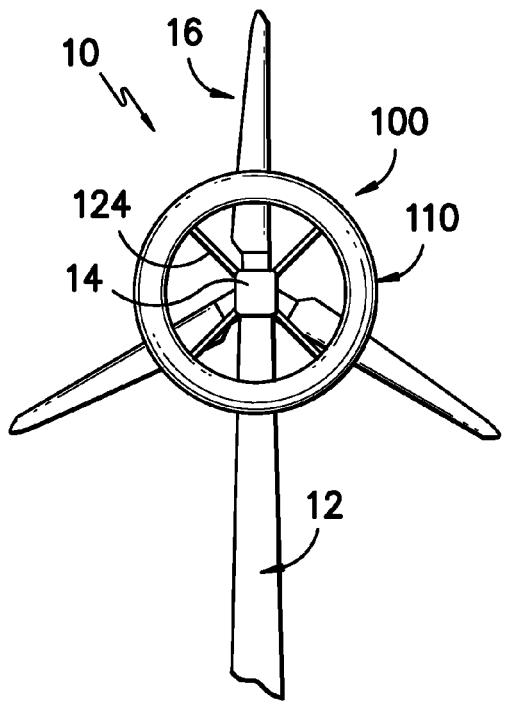
FIG. -4-
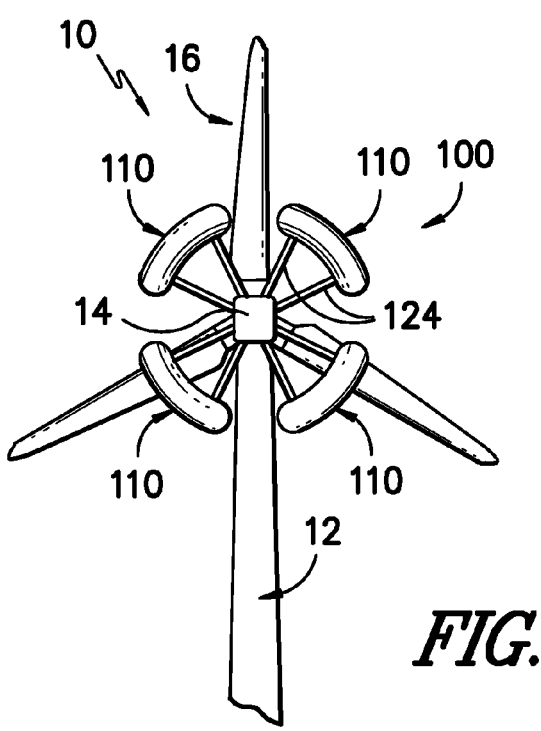
FIG. -5-

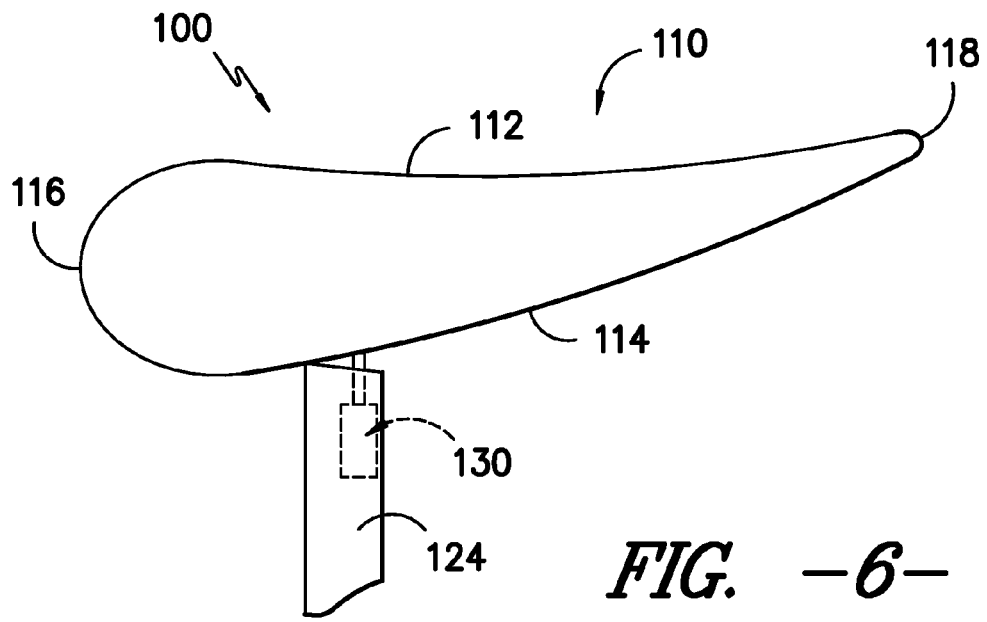
FIG. -6-
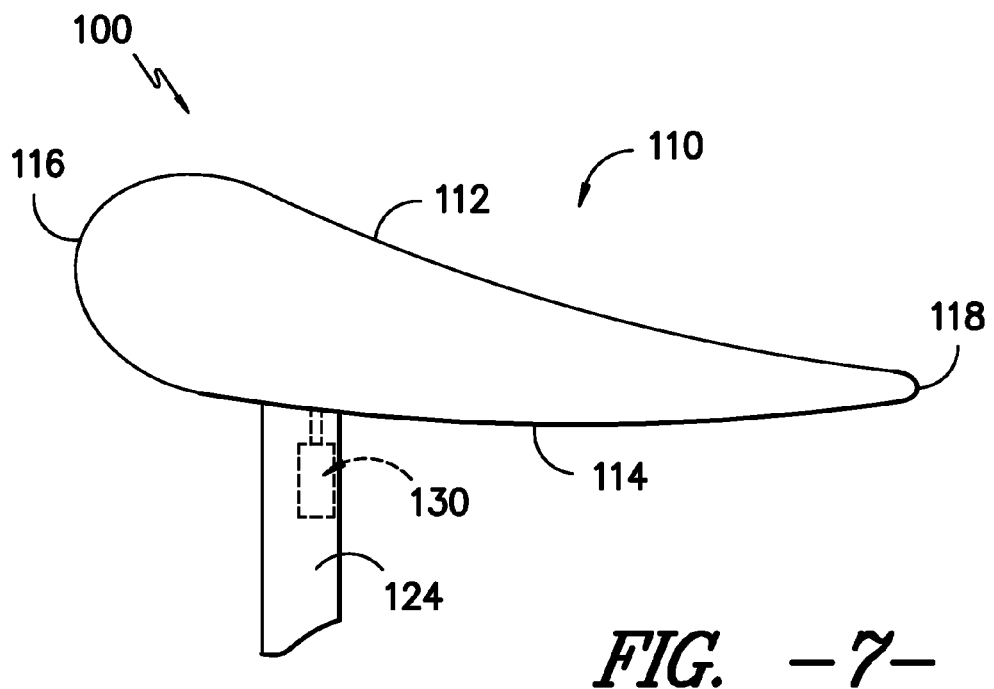
FIG. -7-

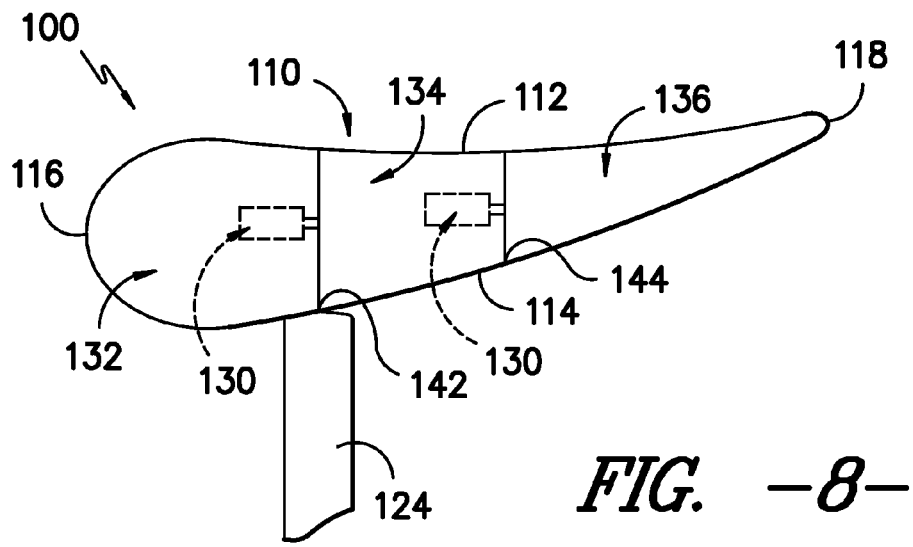
FIG. -8-
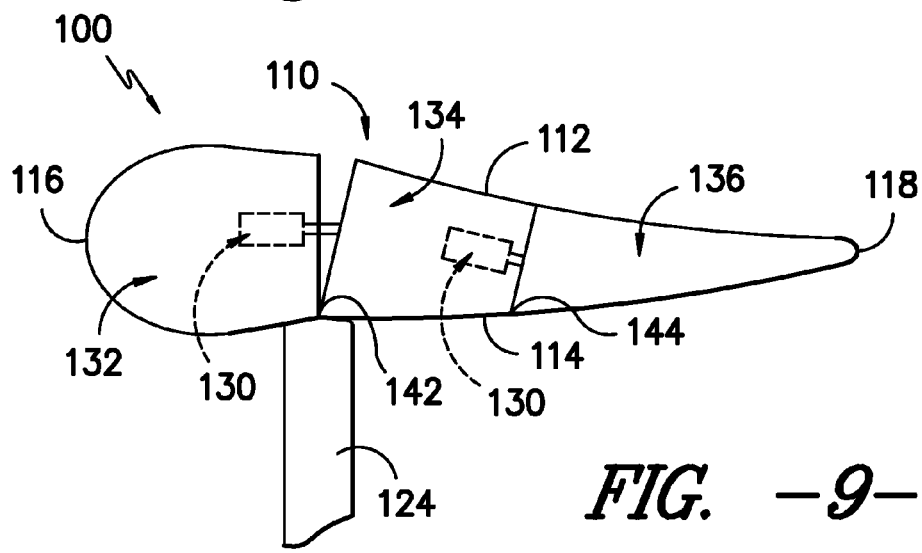
FIG. -9-
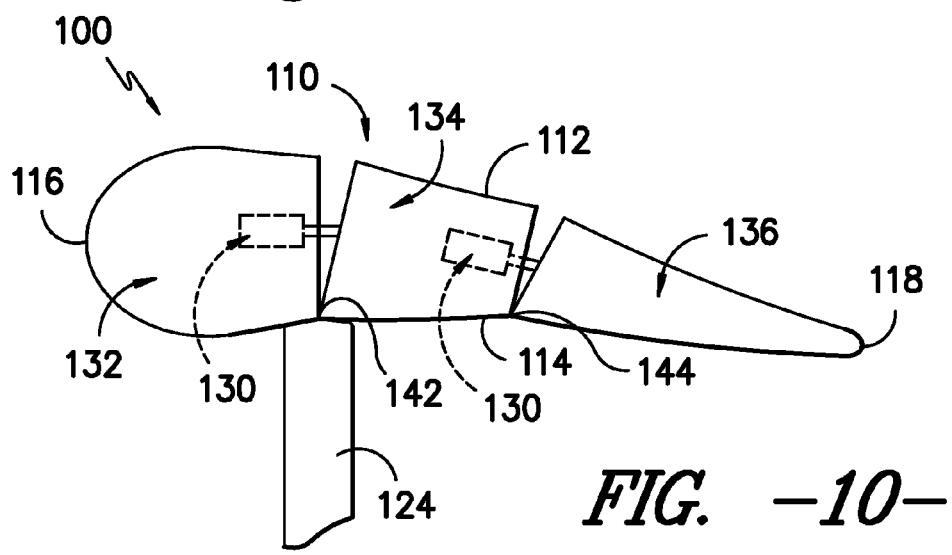
FIG. -10-

WIND TURBINE SHROUD

FIELD OF THE INVENTION

The present disclosure relates in general to wind turbines, and more particularly to shrouds provided on the wind turbines to increase the performance of the wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

It is generally know that the efficiency and power coefficient of a typical open wind turbine, i.e. a wind turbine without any coverings or other performance enhancing apparatus, is limited by the Betz limit. However, various apparatus have been included on wind turbines to exceed the Betz limit and thus increase the efficiency and power coefficient of the wind turbine.

For example, shroud apparatus have been included on wind turbines. One approach is to utilize a shroud having a diameter that exceeds the total outer diameter of the rotor blades, such that the rotor blades fit within the shroud. Another approach is to connect a portion of the shroud to the tip of each of the rotor blades. During operation, the shrouds cause the air flow past the rotor blades to increase, allowing the rotor blades to extract more energy and thus increasing the efficiency and power coefficient of the wind turbine.

However, such known shrouds have various disadvantages. For example, as wind turbines and the associated rotor blades increase in size, the shrouds must additionally increase in size in order for the rotor blades to fit within, or in order for the shroud portions mounted to the rotor blade tips to function adequately. However, such increases in size may require prohibitive amounts of materials and expenses.

Accordingly, improved shrouds for wind turbines and methods for modifying the performance of wind turbines would be desired. For example, an improved shroud and method for increasing the performance of a wind turbine would be advantageous.

BRIEF DESCRIPTION OF THE INVENTION

Aspects and advantages of the invention will be set forth in part in the following description, or may be obvious from the description, or may be learned through practice of the invention.

In one embodiment, a wind turbine is disclosed. The wind turbine includes a tower, a nacelle mounted to the tower, and a rotor mounted to the nacelle. The rotor includes a plurality of rotor blades and defines an outer diameter. The wind turbine further includes a shroud positioned downstream of the rotor in an air flow direction. The shroud has an inner diameter of less than the outer diameter of the rotor.

In another embodiment, a shroud for a wind turbine is disclosed. The wind turbine includes a rotor mounted to a nacelle, the rotor comprising a plurality of rotor blades and defining an outer diameter. The shroud includes an airfoil section having surfaces defining a pressure side and a suction side extending between a leading edge and a trailing edge. The shroud has an inner diameter of less than the outer diameter of the rotor.

In another embodiment, a method for modifying performance of a wind turbine is disclosed. The method includes providing a shroud downstream of a rotor of the wind turbine in an air flow direction. The rotor includes a plurality of rotor blades and defines an outer diameter. The shroud has an inner diameter of less than the outer diameter of the rotor. The method further includes rotating the rotor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a side view of a wind turbine according to another embodiment of the present disclosure;

FIG. 3 is a rear view of a wind turbine according to one embodiment of the present disclosure;

FIG. 4 is a rear view of a wind turbine according to another embodiment of the present disclosure;

FIG. 5 is a rear view of a wind turbine according to another embodiment of the present disclosure;

FIG. 6 is a side view of a portion of a shroud for a wind turbine in an operable position according to one embodiment of the present disclosure;

FIG. 7 is a side view of a portion of a shroud for a wind turbine in an non-operable position according to one embodiment of the present disclosure;

FIG. 8 is a side view of a portion of a shroud for a wind turbine in an first operable position according to another embodiment of the present disclosure;

FIG. 9 is a side view of a portion of a shroud for a wind turbine in an non-operable position according to another embodiment of the present disclosure; and, FIG. 10 is a side view of a portion of a shroud for a wind turbine in a second operable position according to another embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 illustrate embodiments of a wind turbine 10 of conventional construction. The wind turbine 10 includes a tower 12 with a nacelle 14 mounted thereon. A rotor is mounted to the nacelle 14. The rotor includes a plurality of rotor blades 16 mounted to a rotor hub 18, which is in turn connected to a main flange that turns a main rotor shaft. The wind turbine power generation and control components are housed within the nacelle 14. The wind turbines 10 of FIGS. 1 and 2 are provided for illustrative purposes only to place the present invention in an exemplary field of use. It should be appreciated that the invention is not limited to any particular type of wind turbine configuration.

Referring to FIGS. 1 through 5, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand or reduce flapwise and edgewise loads during operation of the wind turbine 10, and may further provide clearance for the rotor blade 16 from the tower 12 during operation of the wind turbine 10.

As shown, the rotor may further define an outer diameter 40. The outer diameter is the diameter of the circumferential path defined by the tips 32 of the rotor blades 16, as shown.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, 60%, 67%, or any percentage or range of percentages therebetween, or any other suitable percentage or range of percentages, of a span of the rotor blade 16 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 33%, 40%, 50%, 60%, 67%, or any percentage or range of percentages therebetween, or any other suitable percentage or range of percentages, of the span from the tip 32.

As shown in FIGS. 1 through 10, a wind turbine 10 according to the present disclosure further includes a shroud 100. The shroud 100 may be positioned downstream of the rotor in the direction of flow 102 of air past the rotor. Further, the shroud 100 has an inner diameter 104, such as a maximum inner diameter 104, of less than the outer diameter 40 of the rotor. Shrouds 100 according to the present disclosure may modify the performance of the wind turbine 10. For example, the efficiency and power coefficient of a wind turbine 10 may be increased due to the addition of a shroud 100 to the wind turbine 10, thus increasing the performance of the wind turbine 10.

In general, a shroud 100 according to the present disclosure includes at least one airfoil section 110. The airfoil section 110 may have a generally aerodynamic contour. For example, the airfoil section 110 may have surfaces defining a pressure side 112 and a suction side 114 extending between a leading edge 116 and a trailing edge 118, as shown. Alternatively, the airfoil section 110 may have any other suitable aerodynamic contour that may interact with air flow to modify the performance of the wind turbine 10.

In some embodiments, as shown in FIGS. 3 and 4, the shroud 100 includes a single airfoil section 110. The airfoil section 110 may be generally arcuate, thus extending in a generally circumferential manner. In some embodiments, the airfoil section 110 may be circumferentially continuous, as shown in FIG. 4, and thus be generally ring shaped. In other embodiments, the airfoil section 110 may define a gap 122, as shown in FIG. 3. The gap 122 may be sized to allow the tower 12 to fit within the gap 122, as shown.

Alternatively, as shown in FIG. 5, the shroud 100 may include a plurality of airfoil sections 110. The airfoil sections 110 may be arranged in an annular array, as shown, and may further be generally arcuate. Further, the airfoil sections 110 may be spaced apart from each other, or may be adjacent and in contact with each other. Two, three, four, five, six or more airfoil sections 110 may be included in a shroud 110 according to the present disclosure.

Referring again to FIG. 1, in some embodiments, the shroud 100 may be aligned with the tower 12 in the direction of flow 102 of the air. In these embodiments, a shroud 100 having a gap 122 or including a plurality of spaced apart airfoil sections 110 may be required, such that the shroud 100 and tower 12 generally fit together. Referring to FIG. 2, however, in other embodiments, the shroud 100 need not be aligned with the tower 12. For example, the shroud 100 in some embodiments may be positioned downstream of the tower 12 in the direction of flow 102 of the air. In these embodiments, a shroud 100 having a gap 122 or including a plurality of spaced apart airfoil sections 110, or a shroud 100 that is circumferentially continuous or that includes a plurality of adjacent, contacting airfoil sections 110, may be utilized.

As shown in FIGS. 1 through 5, the shroud 100, such as the airfoils sections 110 thereof, may be connected to the wind turbine 10. For example, rods 124, poles, or other suitable connection apparatus may be provided between the shroud 100 and the wind turbine 10, such as between each airfoil section 110 and a component of the wind turbine 10 such as the nacelle 14 or tower 12, to connect the shroud 100 to the wind turbine 10. In exemplary embodiments, the shroud 100 may be connected to the nacelle 14, as shown. In other embodiments, however, the shroud 100 may be connected to the tower 12 or any other suitable component of the wind turbine 10.

As mentioned above, shrouds 100 according to the present disclosure are designed to modify the performance of a wind turbine 10. For example, exemplary shrouds 100 may increase the performance of wind turbines 10 through increases in efficiency and power coefficient. For example, in some embodiments as shown in FIGS. 1 and 3 through 5, the shroud 100 may be configured to accelerate air flow therethrough. As shown, the airfoil sections 110 may be oriented with suction sides 114 or other similar surfaces facing inward, and with pressure sides 112 or other similar surfaces facing outward. The shroud 100 in this configuration thus acts as a diffuser, directing air flow into and through the shroud 100 and accelerating this air. Such acceleration may force additional air flow past the rotor blades 16, which may increase efficiency and power coefficient and thus the performance of the wind turbine 10.

In other embodiments as shown in FIG. 2, the shroud 100 may be configured to direct air flow to the outside of the shroud 100. As shown, the airfoil sections 110 may be oriented with suction sides 114 or other similar surfaces facing outward, and with pressure sides 112 or other similar surfaces facing inward. The shroud 100 in this configuration directs air flow to the outside of the shroud 100, such that less, slower air is passing through the shroud 100. However, because the air flow is directed outside of the shroud 100, an increased amount of air may pass by the outboard areas 54 of the rotor blades 16. Because the outboard area 54 is typically more efficient at interacting with air than the inboard area 52, such increased interaction of air with the outboard areas 54 may increase efficiency and power coefficient and thus the performance of the wind turbine 10.

In some embodiments, the shroud 100 and various components thereof may be actuatable between operable positions and non-operable positions, or between varying operable positions and/or between such varying operable positions and non-operable positions. For example, FIGS. 6 and 7 illustrate one embodiment of a shroud 100, such as an airfoil section 110 thereof. In FIG. 6, the shroud 100 is shown in an operable position. In the operable position, the shroud 100 may be configured to modify, such as increase, the performance of the wind turbine 10, as discussed above. In FIG. 7, the shroud 100 is shown in a non-operable position. In the non-operable position, the effects of the shroud 100 on the performance of the wind turbine 10 may be reduced from the effects in the operable position. Thus, while the shroud 100 in the non-operable position may somewhat modify the performance of the wind turbine 10, this performance modification may be relatively minimal as compared to the performance modification when in the operable position.

As shown in FIGS. 6 and 7, the shroud 100, such as the various components thereof, is rotated between the operable position and non-operable position. Actuators 130 may be connected to the shroud 100, such as to the various components thereof, to facilitate actuation of the shroud 100 between the operable and non-operable positions. An actuator 130 may be a cylinder as shown, such as a pneumatic or hydraulic cylinder, or may be a gear-driven device or other suitable actuation device. As shown in FIGS. 6 and 7, an actuator 130 may for example be positioned within a rod 124 and connected to an airfoil section 110. Actuation of the actuator 130 may rotate the airfoil section 110 between an operable position and a non-operable position, as shown.

FIGS. 8 through 10 illustrate another embodiment of a shroud 100, such as an airfoil section 110 thereof. In FIG. 8, the shroud 100 is shown in a first operable position. In the operable position, the shroud 100 may be configured to modify, such as increase, the performance of the wind turbine 10, as discussed above. For example, in the first operable position as shown, the shroud 100 is configured to accelerate air flow therethrough. In FIG. 9, the shroud 100 is shown in a non-operable position. In the non-operable position, the effects of the shroud 100 on the performance of the wind turbine 10 may be reduced from the effects in the first and second operable positions. Thus, while the shroud 100 in the non-operable position may somewhat modify the performance of the wind turbine 10, this performance modification may be relatively minimal as compared to the performance modification when in the first or second operable positions. In FIG. 10, the shroud 100 is shown in a second operable position. In the operable position, the shroud 100 may be configured to modify, such as increase, the performance of the wind turbine 10, as discussed above. For example, in the second operable position as shown, the shroud 100 is configured to direct air flow to the outside of the shroud 100.

As shown in FIGS. 8 through 10, the shroud 100, such as the various components thereof, may be divided into various portions. The various portions may be movable relative to each other to actuate the shroud 100 between the various operable and non-operable positions. For example, FIGS. 8 through 10 illustrate an airfoil section 110 divided into a front section 132, a middle section 134, and an end section 136. Hinges 142 and 144 may connected the sections and allow movement, such as rotation, of the sections relative to each other. Actuators 130 may be connected to the shroud 100, such as to the various components thereof, to facilitate actuation of the shroud 100 between the operable and non-operable positions. An actuator 130 may be a cylinder as shown, such as a pneumatic or hydraulic cylinder, or may be a gear-driven device or other suitable actuation device. As shown in FIGS. 8 through 10, an actuator 130 may for example be positioned within various of the sections 132, 134 and/or 136 and connected to adjacent sections 132, 134 and/or 136. Actuation of the actuators 130 may rotate the sections 132, 134 and/or 136 between the operable and non-operable positions, as shown.

In other embodiments, the shroud 100, such as the various components thereof, may be inflatable to an operable position and deflatable to a non-operable position, or vice versa. In these embodiments, the actuator 130 may be an inflator device. In still further embodiments, the shroud 100, such as the various components thereof, may include any other suitable actuation devices for actuating the shroud 100 between operable and non-operable positions, as desired or required.

The present disclosure is further directed to a method for modifying performance of a wind turbine 10. The method includes, for example, providing a shroud 100 downstream of a rotor of the wind turbine 10 in an air flow direction 102. The shroud 100 has an inner diameter 104 of less than the outer diameter 40 of the rotor. The method further includes rotating the rotor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine, comprising:
   a tower;
   a nacelle mounted to the tower;
   a rotor mounted to the nacelle, the rotor comprising a plurality of rotor blades and defining an outer diameter; and
   a shroud positioned downstream of the rotor in an air flow direction, the shroud having a maximum inner diameter of less than the outer diameter of the rotor.

2. The wind turbine of claim 1, wherein the shroud comprises a generally arcuate airfoil section.

3. The wind turbine of claim 2, wherein the generally arcuate airfoil section is circumferentially continuous.

4. The wind turbine of claim 1, wherein the shroud comprises a plurality of airfoil sections arranged in a generally annular array.

5. The wind turbine of claim 1, wherein the shroud is configured to accelerate air flow therethrough.

6. The wind turbine of claim 1, wherein the shroud is configured to direct air flow to the outside of the shroud.

7. The wind turbine of claim 1, wherein the shroud is connected to the nacelle.

8. The wind turbine of claim 1, wherein the shroud is aligned with the tower in the air flow direction.

9. The wind turbine of claim 1, wherein the shroud is actuatable between a non-operable position and an operable position.

10. The wind turbine of claim 1, wherein the shroud is actuatable between a first operable position wherein air flow is accelerated therethrough and a second operable position wherein air flow is directed to the outside of the shroud.

11. A shroud for a wind turbine, the wind turbine comprising a rotor mounted to a nacelle, the rotor comprising a plurality of rotor blades and defining an outer diameter, the shroud comprising:
   an airfoil section having surfaces defining a pressure side and a suction side extending between a leading edge and a trailing edge,
   wherein the shroud has a maximum inner diameter of less than the outer diameter of the rotor.

12. The shroud of claim 11, wherein the airfoil section is generally arcuate.

13. The shroud of claim 12, wherein the generally arcuate airfoil section is circumferentially continuous.

14. The shroud of claim 11, further comprising a plurality of airfoil sections arranged in a generally annular array.

15. The shroud of claim 11, wherein the airfoil section is configured to accelerate air flow therethrough.

16. The shroud of claim 11, wherein the airfoil section is configured to direct air flow to the outside of the shroud.

17. The shroud of claim 11, wherein the airfoil section is actuatable between a non-operable position and an operable position.

18. The shroud of claim 11, wherein the airfoil section is actuatable between a first operable position wherein air flow is accelerated therethrough and a second operable position wherein air flow is directed to the outside of the airfoil section.

19. A method for modifying performance of a wind turbine, comprising:
   providing a shroud downstream of a rotor of the wind turbine in an air flow direction, the rotor comprising a plurality of rotor blades and defining an outer diameter, the shroud having a maximum inner diameter of less than the outer diameter of the rotor; and
   rotating the rotor.

20. The method of claim 19, wherein the shroud is configured to accelerate air flow therethrough.

* * * * *